(12) United States Patent
Kinoshita et al.

(10) Patent No.: US 7,652,402 B2
(45) Date of Patent: Jan. 26, 2010

(54) BRUSHLESS MOTOR

(75) Inventors: Nobuo Kinoshita, Matsudo (JP);
Yuichiro Matsuoka, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 253 days.

(21) Appl. No.: 11/751,717

(22) Filed: May 22, 2007

(65) Prior Publication Data
US 2007/0273221 A1    Nov. 29, 2007

(30) Foreign Application Priority Data
May 25, 2006    (JP)    ............................... 2006-144782

(51) Int. Cl.
*H02K 11/00*    (2006.01)
(52) U.S. Cl. .......................................... 310/71; 310/55
(58) Field of Classification Search .................... 310/71, 310/260, 270, 65, 55, 56, 58, 59
See application file for complete search history.

(56) References Cited

U.S. PATENT DOCUMENTS

| | | | | |
|---|---|---|---|---|
| 3,984,714 A | * | 10/1976 | Grozinger et al. ........... | 310/194 |
| 5,828,147 A | * | 10/1998 | Best et al. ..................... | 310/71 |
| 5,898,246 A | * | 4/1999 | Hoffman .................. | 310/60 R |
| 6,177,741 B1 | * | 1/2001 | Lutkenhaus et al. .......... | 310/71 |
| 6,856,055 B2 | * | 2/2005 | Michaels et al. .............. | 310/71 |
| 7,498,702 B2 | * | 3/2009 | Migita et al. .................. | 310/71 |

FOREIGN PATENT DOCUMENTS

| | | |
|---|---|---|
| JP | 2882594 | 2/1999 |
| JP | 2005-328661 | 11/2005 |

* cited by examiner

*Primary Examiner*—Dang D Le
(74) *Attorney, Agent, or Firm*—McGlew and Tuttle, P.C.

(57) ABSTRACT

A plurality of coils wound around a stator magnetic-pole core are connected together and connected to output wires by use of a bus bar. The bus bar having a generally cylindrical body portion is disposed at one axial end of the stator magnetic-pole core, around which the coils are wound such that clearances are formed within magnetic-pole core slots, with an axial clearance formed between the bus bar and the coils. The body portion has such a radial dimension that at least a portion of the clearances within the magnetic-pole core slots is left uncovered. Air holes are formed in the motor housing on opposite sides of the stator magnetic-pole core to thereby form cooling air passages extending through the magnetic-pole core slots.

20 Claims, 10 Drawing Sheets

BUS BAR BODY
BUS BAR LEG
CORE GROOVE
MAGNETIC-POLE CORE
COIL

OUTPUT-SIDE TERMINAL
BUS BAR BODY
COIL-SIDE TERMINAL
BUS BAR LEG

BUS BAR BODY
BUS BAR LEG

MAGNETIC-POLE CORE
CORE GROOVE
COIL

BRUSHLESS MOTOR

BACKGROUND OF THE INVENTION

1. Field of the Invention

The present invention relates to a brushless motor in which stator coils are connected together and are connected to output wires by use of a bus bar.

2. Description of the Related Art

When a motor is used for drive of an electric power tool or the like, a relatively large current flows through the coils of the motor. Therefore, heat generated as a result of the current flowing through the coils must be removed by means of cooling. If the generated heat is not removed, the current decreases because of an increase in the resistance of the coils, with a resultant decrease in output torque of the motor. A conventional cooling apparatus for a motor has a structure as shown in FIG. 11 (see Japanese Patent No. 2882594). A plurality of radial and axial through holes are formed in a motor casing and an end cap, respectively. A stator, composed of a magnetic-pole core and coils wound around the magnetic-pole core, and switching elements constituting a drive circuit are attached to an inner wall surface of the motor casing. A rotor is fixedly provided on a rotation shaft, and a blower fan is fixedly provided adjacent to the rotor. A small clearance which serves as a cooling air passage is formed between the rotor and the stator magnet-pole core. When electricity is supplied to the stator coils via the drive circuit and the rotor rotates, the coils, the drive circuit, etc., generate heat. However, the blower fan rotates together with the rotor, and as a result of rotation of the blower fan, cooling air entering from the through holes flows through the cooling air passage to thereby cool the coils, the drive circuit, etc.

However, the cooling air merely passes through the clearance between the rotor and the stator, and does not flow along the surfaces of the coils, from which heat is generated. Therefore, heat generated from the coils cannot be directly removed, and therefore a sufficient cooling effect cannot be attained.

Meanwhile, conventionally, wire harnesses or a bus bar is used for connecting wires from an external power source to coils. However, in ether case, the wiring hinders cooling of the motor.

FIG. 12 is a view of a stator of a brushless motor as viewed from a side from which coils are extended, and shows an example in which wire harnesses are used. In order to form a Y connection, one ends of U-phase, V-phase, and W-phase coils of the brushless motor are connected together by use of a Y-connection insulating sleeve. The other ends of these coils are connected to three-phase output wire harnesses, which serve as lead wires, via respective insulating sleeves. The three wire harnesses for three-phase output are routed on the end surfaces of the stator coils as shown in FIG. 12 so as to extend to the outside of the motor housing from a single location. Therefore, the length and size of the motor increase, and due to complexity of the wire connection, the numbers of steps and components increase, with a resultant increase in cost. Further, the routed portions of the wire harnesses and the sleeves for connecting the coils and the wire harnesses close the clearances between the coils wound around the stator core, and therefore cooling air passages cannot be formed there.

FIG. 13 is a view showing a method in which coils are connected by use of a bus bar (see Japanese Patent Application Laid-Open (kokai) No. 2005-328661. As shown in FIG. 13, coils are wound around a stator magnetic-pole core. The bus bar is composed of wiring bar groups for connecting a large number of coil segments which constitute the coils, and an insulating member which supports the wiring bar groups at respective spatial positions while electrically insulating them. The wiring bar groups include three output wires projecting from the bus bar. Through use of such a bus bar, the coils can be connected together and be connected to the output wires. However, as in the above-described case where wire harnesses are used, the clearances between the coils wound around the stator magnetic-pole core are closed by the bus bar, and therefore cooling air passages cannot be formed there.

SUMMARY OF THE INVENTION

The present invention has been accomplished so as to solve the above-described problem, and an object of the present invention is to reduce the volume of a space occupied by harnesses and connection wiring to thereby reduce the size of a motor, and to enable cooling air generated within a motor casing to easily flow through the spaces of magnetic-pole slots, to thereby improve cooling efficiency.

A brushless motor of the present invention comprises a stator fixedly provided within a motor casing and a rotor fixed to a rotation shaft. A plurality of coils wound around a stator magnetic-pole core are connected together and connected to output wires by use of a bus bar. This bus bar includes a body portion formed of an insulating member and having grooves formed therein. Wiring bars each formed of an electrically conductive metal and having integrally formed connection terminals are disposed in the grooves. The coils are wound around the stator magnetic-pole core such that clearances are formed within magnetic-pole core slots. The bus bar is disposed at one axial end of the stator magnetic-pole core with an axial clearance formed between the bus bar and the coils, and the body portion has such a radial dimension that at least a portion of the clearances within the magnetic-pole core slots is left uncovered. Air holes are formed in the motor housing on opposite sides of the stator magnetic-pole core to thereby form cooling air passages extending through the magnetic-pole core slots.

Further, a disk-shaped sensor rotor for position detection, which has a diameter smaller than an inner diameter of the body portion of the bus bar, is provided on the rotor to be located radially inward of the bus bar, and the bus bar has an outer diameter smaller than an outer diameter of the magnetic-pole core. The bus bar has a plurality of bus bar legs formed integrally with the body portion and adapted to be fitted into grooves formed on an outer circumferential surface of the stator magnetic-pole core. The bus bar legs are disposed to overlap core arm portions of the stator magnetic-pole core around which the coils are wound. The connection terminals of the bus bar to which ends of the coils are connected are disposed to overlap the clearances between the core arm portions as viewed in the axial direction of the motor, whereby the connection terminals are positioned on passages of air flowing through the clearances. The wiring bars of the bus bar each have a cross sectional area greater than that of a wire forming the coils.

The motor housing is composed of a cylindrical motor casing, and end and front bells attached to opposite opening portions of the motor casing. A cooling fan is fixed to the rotation shaft to be located on one side of the rotor. Air intake and discharge holes are formed in the cylindrical motor casing, the end bell, and/or the front bell to be located on opposite sides of the stator magnetic-pole core.

According to the present invention, a flow of cooling air generated within the motor casing due to rotation of the cooling fan or the like easily passes through the core slot spaces, whereby the motor-coil cooling efficiency can be improved. Further, even in the case where forced cooling by means of a cooling fan or the like is not performed, a flow of air is improved, and stagnation of heat can be mitigated.

Moreover, according to the present invention, the volume of the space occupied by harnesses and connection wirings decreases, and electricity-supply wiring can be simplified, whereby the cost and size of the motor can be reduced. In addition, the cooling efficiency can be improved so as to improve the performance and reliability of the motor.

DETAILED DESCRIPTION OF THE PREFERRED EMBODIMENTS

Figure 1:
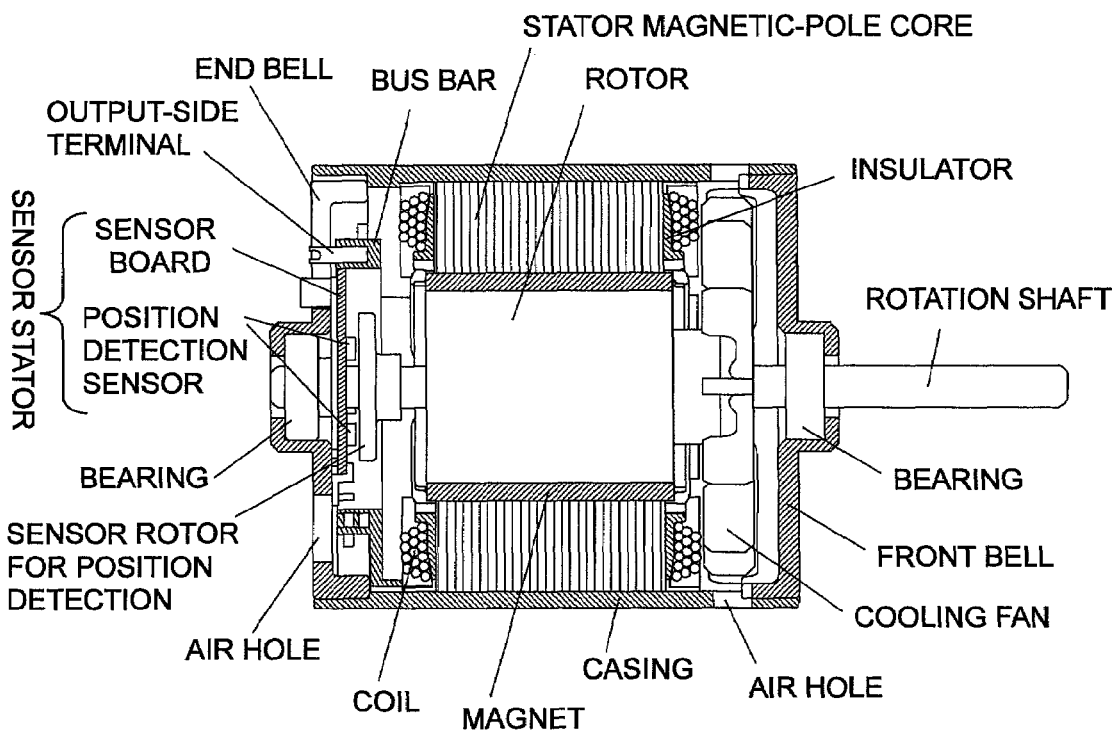
FIG. 1 is a cross sectional view showing the overall structure of a brushless motor equipped with a bus bar according to a first embodiment.

The present invention will now be described by way of examples. FIG. 1 is a cross sectional view showing the overall structure of a brushless motor equipped with a bus bar according to a first embodiment. A motor housing is composed of a cylindrical casing formed of a metal or a resin, a front bell formed of a metal or a resin and attached to one end opening portion of the cylindrical casing, and an end bell formed of a metal or a resin and attached to the other end opening portion of the cylindrical casing. A stator is fixed to the inner wall surface of the cylindrical casing. The stator includes a magnetic-pole core, and coils wound around the core via an insulating means such as an insulator. Bearings for supporting a rotation shaft of a rotor are fixedly accommodated in central portions of the front bell and the end bell. One end of the shaft projects from the front bell toward the outside of the motor housing, and an external apparatus to be driven is connected to the projecting end.

In the brushless motor shown in FIG. 1, a cooling fan is fixed to the rotation shaft to be located at one end (e.g., on the front-bell side as illustrated) of the rotor. Air holes which partially form an air flow passage extending through inter-coil clearances in magnetic-pole core slots are formed in the motor housing to be located on opposite sides of the stator magnetic-pole core. In the illustrated example, discharge air holes are formed in the cylindrical casing at positions located radially outward of the cooling fan, and intake air holes are formed in the end bell located opposite the cooling fan. The intake holes are provided at positions on a circle which approximately corresponds to the coils and the inter-coil clearances in the radial direction. The diameter of a sensor rotor for position detection is made smaller than the diameter of the circle on which the air holes of the end bell are located so that the rotor does not close the air flow passage. The arrangement of the air holes formed in the motor housing is not limited to the illustrated arrangement, and can be changed in various manners in accordance with the blade shape of the cooling fan. For example, the intake air holes may be formed in the cylindrical casing rather than in the end bell as illustrated. Alternatively, the discharge air holes may be formed in the cooling-fan-side front bell rather than in the cylindrical casing as illustrated, and the intake air holes may be formed in the end bell or the cylindrical casing to be located on the opposite side of the stator magnetic-pole core. Further, in the present embodiment, the position detection sensor (the rotor and stator thereof) is provided on the side of the stator magnetic-pole core opposite the cooling fan. However, the position detection sensor may be provided on the same side as the cooling fan; that is, between the cooling fan and the front bell or the end bell.

Figure 2:
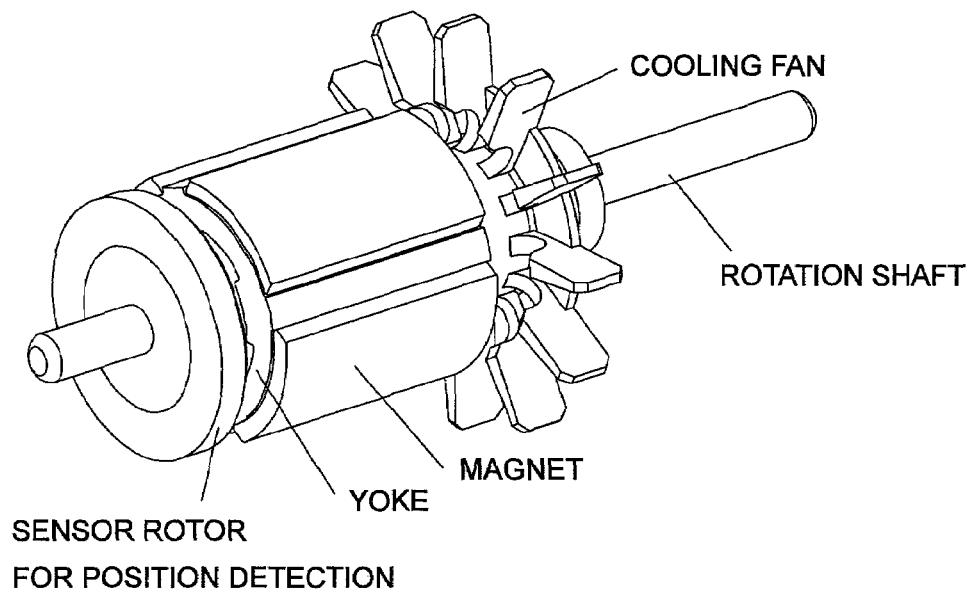
FIG. 2 is a perspective view of a rotor of the motor.

FIG. 2 is a perspective view of the rotor of the motor. The rotor is composed of a yoke fixed to the rotation shaft, and a plurality of magnets (four magnets in the in the illustrated example), which serve as rotor magnetic poles, are attached to a surface of the yoke (rotor surface) which faces the stator magnetic-pole core. The cooling fan is fixed to the rotation shaft at one end of the rotor. The cooling fan, which has a plurality of blades fixedly provided at equal circumferential intervals, itself is one ordinarily used in this technical field. The sensor rotor for position detection is fixed to the rotation shaft on the side opposite the cooling fan in FIG. 2. The sensor rotor for position detection is formed of a magnet which is magnetized to have four poles; i.e., alternating two N poles and two S poles at equal intervals. As is well known, magnetic flux generated by the magnet is detected by means of a position detection sensor, such as a Hall element, attached to the stator side, whereby the rotational position of the rotor can be detected.

Figure 3A:
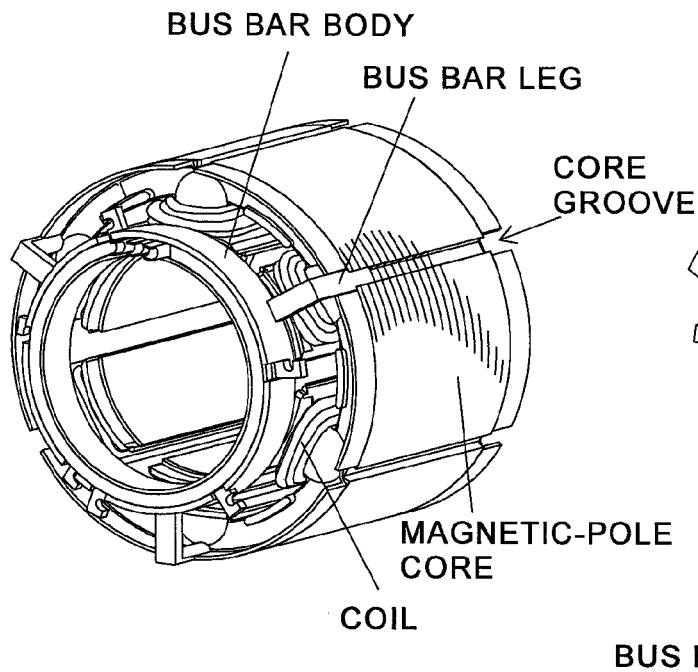
FIG. 3A is a perspective view of a bus bar attached to a coiled magnetic-pole core.
Figure 3B:
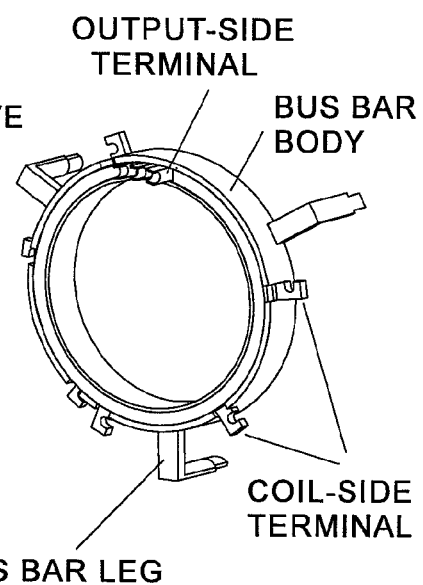
FIG. 3B is a perspective view of the bus bar as viewed from one side thereof.
Figure 3C:
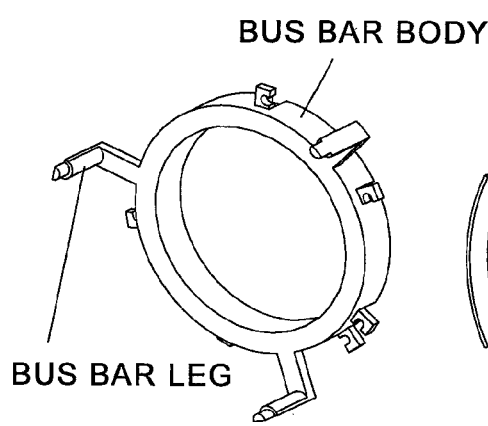
FIG. 3C is a perspective view of the bus bar as viewed from the other side thereof.
Figure 3D:
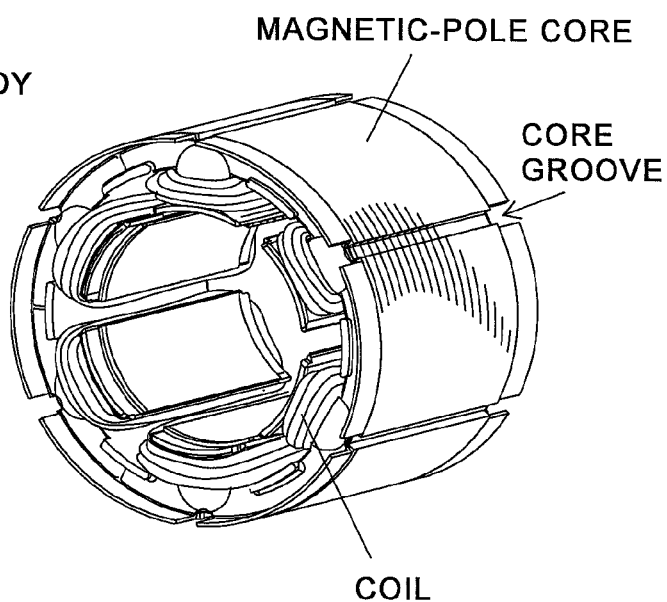
FIG. 3D is a perspective view of the coiled magnetic-pole core with the bus bar removed.

FIG. 3A is a perspective view of the bus bar attached to the coiled magnetic-pole core; FIG. 3B is a perspective view of the bus bar as viewed from one side thereof; FIG. 3C is a perspective view of the bus bar as viewed from the other side thereof; and FIG. 3D is a perspective view of the coiled magnetic-pole core with the bus bar removed. Although the internal structure of the bus bar will be described later, as illustrated, the bus bar includes a cylindrical bus bar body formed of a resin, and three or more (three in the illustrated example) bus bar legs integrally formed with the bus bar body. The legs are inserted into and attached to axially extending core grooves which are provided on the outer circumferential surface of the magnetic-pole core, and, as shown in FIG. 1, the stator with the bus bar attached thereto is fixedly disposed within the cylindrical casing by means of press-fitting, bonding, crimping, or the like. In order to provide a distance between the bus bar and the coils; i.e., in order to prevent the bus bar from coming into contact with the coils, each of the bus bar legs has a base portion extending radially outward from the bus bar body, and a distal portion axially extending from the distal end of the base portion toward the core so as to be inserted into the core grooves. The bus bar legs are disposed to face core arm portions (see FIG. 4B). Therefore, the positions of the core grooves, into which the bus bar legs are inserted, coincide with those of the core arm portions with respect to the circumferential direction. Desirably, the width of the bus bar legs is made narrower than that of the core arm portions so as to prevent the bus bar legs from narrowing the air flow passage to the extent possible. Notably, in the present embodiment, the bus bar body assumes a cylindrical shape. However, the shape of the bus bar body is not limited thereto, and the bus bar body may assume other shapes such an arcuate shape (a C-like shape) and a polygonal shape.

The sensor rotor for position detection, which is attached to the rotor, is disposed radially inward of the bus bar body so as to enable effective use of the internal space of the motor. Therefore, the inner diameter of the bus bar body must be made larger than the diameter of the sensor rotor for position detection. In order to secure a flow passage of cooling air on the radially outer side of the bus bar body, the outer diameter of the bus bar body must be made smaller than the outer diameter of the core. The radial dimension or length of the body portion is decreased so that at least a portion of the clearances within the magnetic-pole core slots is left uncovered, so long as the inner and outer diameters of the bus bar body satisfy the above-described requirements. As will be described later with reference to FIG. 7, the radial dimension can be reduced by arranging the wiring bars of the bus bar to form two or more layers of the wiring bars in the axial direction.

Figure 4A:
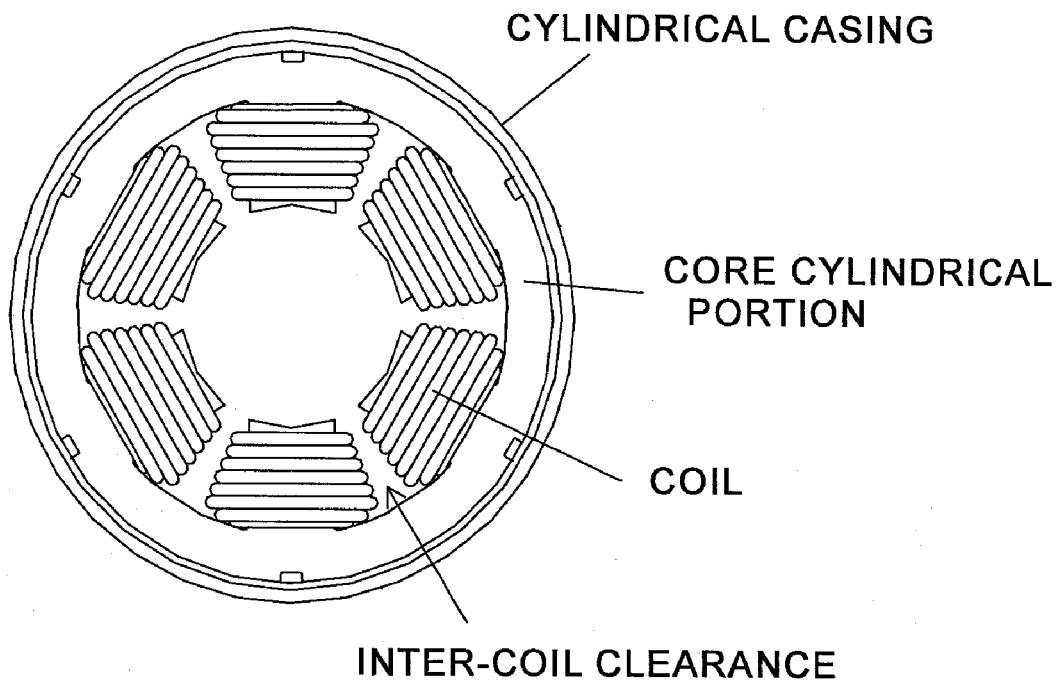
FIG. 4A is a view of the coiled stator core as viewed from an end surface.
Figure 4B:
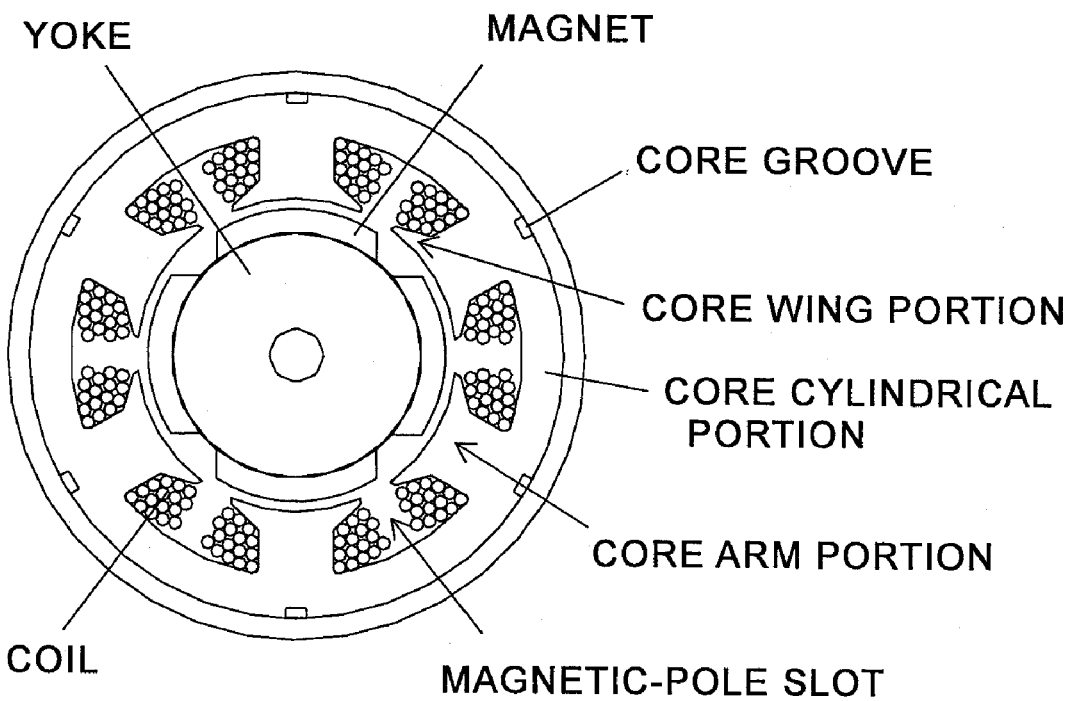
FIG. 4B is a cross sectional view of the stator core taken along an axially central position thereof.

FIG. 4A is a view of the coiled stator core as viewed from an end surface; and FIG. 4B is a cross sectional view of the stator core taken along an axially central position thereof. As shown in the cross sectional view of FIG. 4B, the stator core has a core cylindrical portion fixedly disposed within the cylindrical casing and six core arm portions integrally formed therewith. Each arm portion has, at its distal end, core wing portions extending in opposite circumferential directions. The stator core is formed by stacking magnetic steel plates each having a shape corresponding to the cross sectional shape of the stator core. The brushless motor according to the present embodiment is a three-phase brushless motor. Therefore, coils are wound around the six arm portions, and each pair of two coils located diametrically opposite with respect to the center are connected in series, whereby U-phase, V-phase, and W-phase windings for Y connection are formed. As shown in FIGS. 4A and 4B, clearances are formed between the coils. In other words, although the coils are wound around the core arm portions and within the magnetic-pole slots between the core arm portions, the coils do not occupy the entire cross sections of the magnetic-pole slots, and clearances are left in the magnetic-pole slots.

Figure 5A:
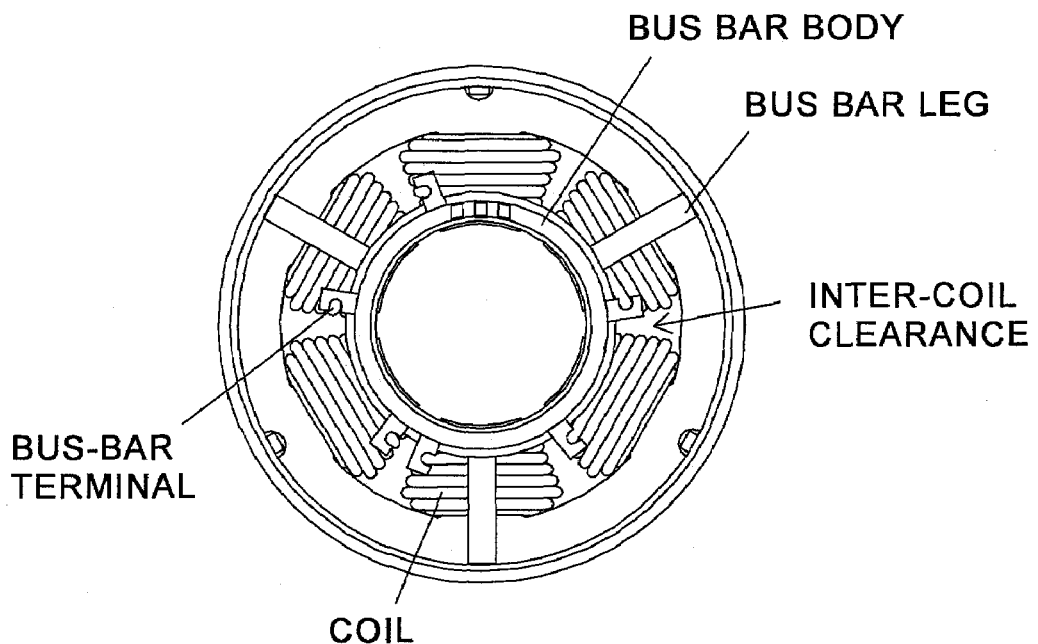
FIG. 5A is an end view of the stator with the rotor removed.
Figure 5B:
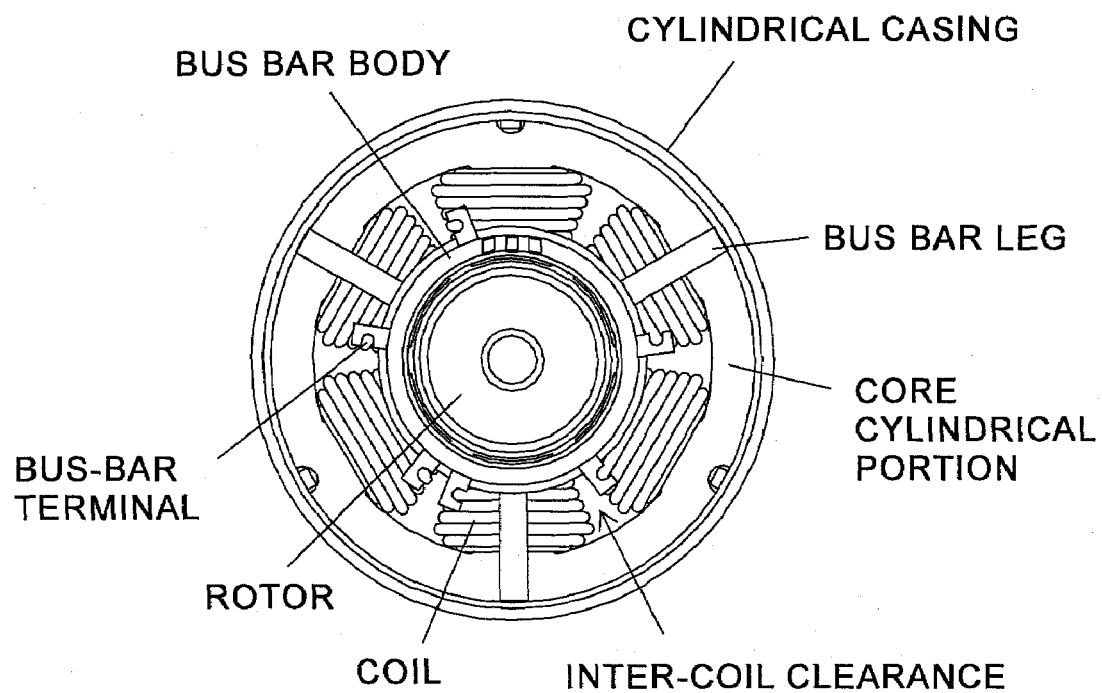
FIG. 5B is an end view of the stator with the rotor assembled.

FIG. 5A is an end view of the stator with the rotor removed; and FIG. 5B is an end view of the stator with the rotor assembled. According to the present invention, the bus bar is fixed in such a manner that the bus bar does not close cooling air flow passages formed in the clearances in the magnetic-pole slots. As shown in FIGS. 5A and 5B, the bus bar is disposed on the core wing portions (see FIG. 4B) located on the inner circumferential side of the core with respect to the radial direction, with an axial clearance formed between the bus bar and the coils. Therefore, the inter-coil clearances are not closed. Further, the bus bar terminals (connection terminals) to which the ends of the coils are connected and which are likely to generate heat are disposed so as not to overlap the core arm portions as viewed in the motor axis direction, whereby the bus bar terminals are positioned in the flow passages along which cooling air flows.

Figure 6:
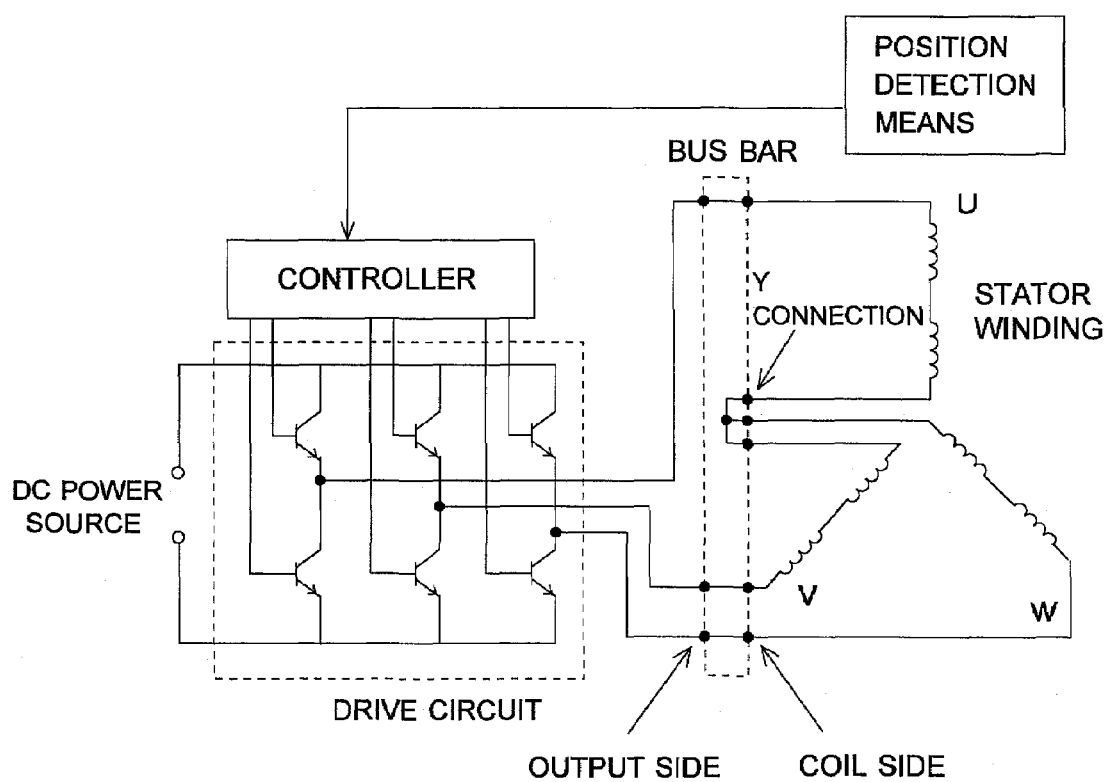
FIG. 6 is a diagram showing electrical connection of the DC brushless motor.

FIG. 6 is a diagram showing electrical connection of the DC brushless motor. The six stator coils are connected in the form of a Y connection. Mutual connection between two coils (located diametrically opposite with respect to the rotation shaft) which constitute each of the U-phase, V-phase, and W-phase windings can be performed by making use of the internal wiring of the bus bar. However, mutual connection between two coils can be performed by directly connecting the winding-ending-side end of the first coil and the winding-starting-side end of the second coil, without use of the bus bar. When mutual connection is not performed by making use of the bus bar, the coils are routed on one end surface of the core cylindrical portion of the stator, the end surface being located on the side toward the bus bar, or are routed on the other end surface thereof opposite the bus bar (the end surface on the side where the cooling fan shown in FIG. 1 is present). The first and second coils may be a continuously wound coil, or may be separate coils. First ends of the windings for respective phases, each winding being composed of two serially connected coils, are connected to corresponding coil-side terminals of the bus bar, and are connected to output-side terminals (to be connected to the drive circuit) via the corresponding wiring bars within the bus bar. Second ends of the windings for respective phases are connected to corresponding coil-side terminals of the bus bar, and are connected together in the form of Y connection via the corresponding wiring bar within the bus bar. The three output-side terminals of the bus bar extended to the outside of the motor housing are connected to the output wires of the drive circuit, and are connected to a DC power source via the drive circuit as shown in FIG. 6.

The drive circuit itself is an ordinary one, and can be formed by use of six switching transistors as shown in FIG. 6. As is well known, a controller which switches the switching transistors of the drive circuit performs the switching control on the basis of a signal from position detection means which detects the rotational position of the motor.

Figure 7A:
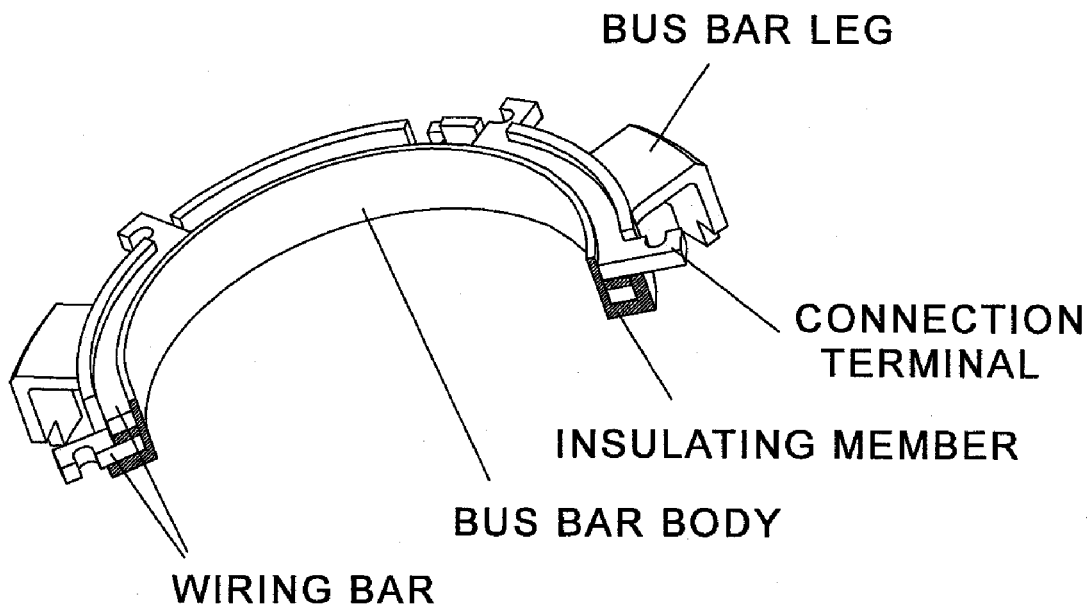
FIGS. 7A and 7B are cross sectional views showing the internal structure of the bus bar.
Figure 7B:
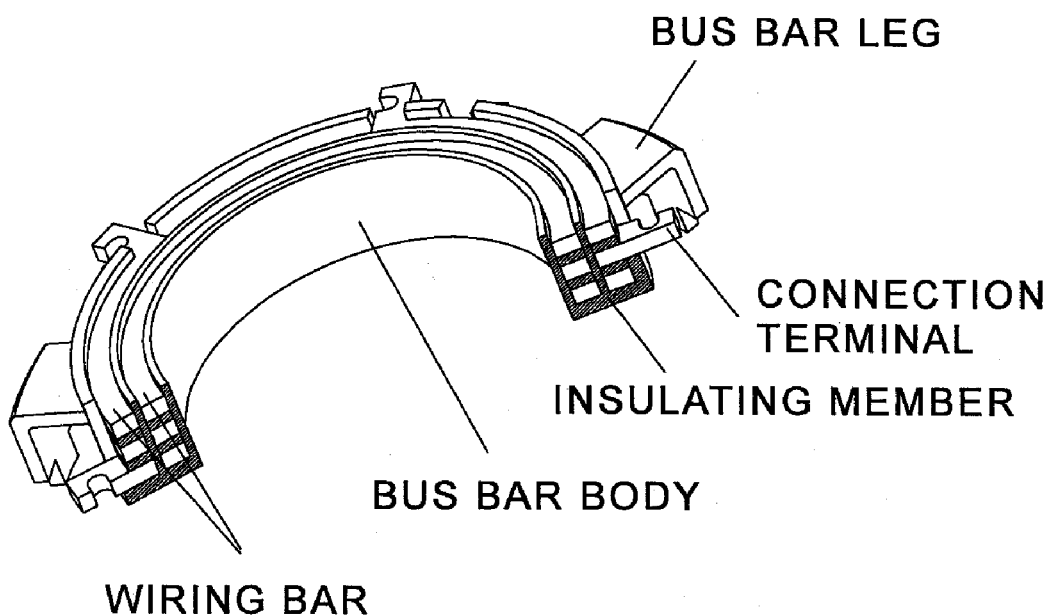

In a 6-pole stator magnetic-pole motor in which mutual connection between two coils which constitute each of the U-phase, V-phase, and W-phase windings is performed without use of the bus bar, as shown in FIG. 3B, the bus bar includes three output-side terminals and six coil-side terminals. FIGS. 7A and 7B are cross sectional views showing the internal structure of the bus bar. FIG. 7A shows an example in which wiring bars are disposed to form two layers of wiring bars in the axial direction (vertical direction in the drawing). FIG. 7B shows an example in which wiring bars are disposed to form three layers of wiring bars in the axial direction. Although not shown, the wiring bars may be disposed to form four or more layers of wiring bars in the axial direction. Moreover, as shown in FIG. 7B, two or more rows of wiring bars may be disposed in the radial direction, so long as the radial size of the bus bar body falls within a predetermined range. The bus bar is formed as follows, for example. Grooves are formed in an insulator formed of a resin, and wiring bars are lightly press-fitted into the grooves. The wiring bars are formed of an electrically conductive metal (e.g., tin-plated copper plate) and have integrally formed connection terminals. In order to suppress heat generation, the cross sectional area of each wiring bar is rendered equal to or greater than the cross sectional area of a wire which forms the coils. As having been described with reference to FIG. 6, the three windings are connected (e.g., welded) to the six connection terminals (coil-side terminals) so as to form a Y connection by use of a wiring bar within the bus bar body, and are connected (e.g., welded) to the output wires via the three output-side terminals. Notably, the connection terminals may be provided on the radially outer side and/or radially inner side of the bus bar body.

Figure 8A:
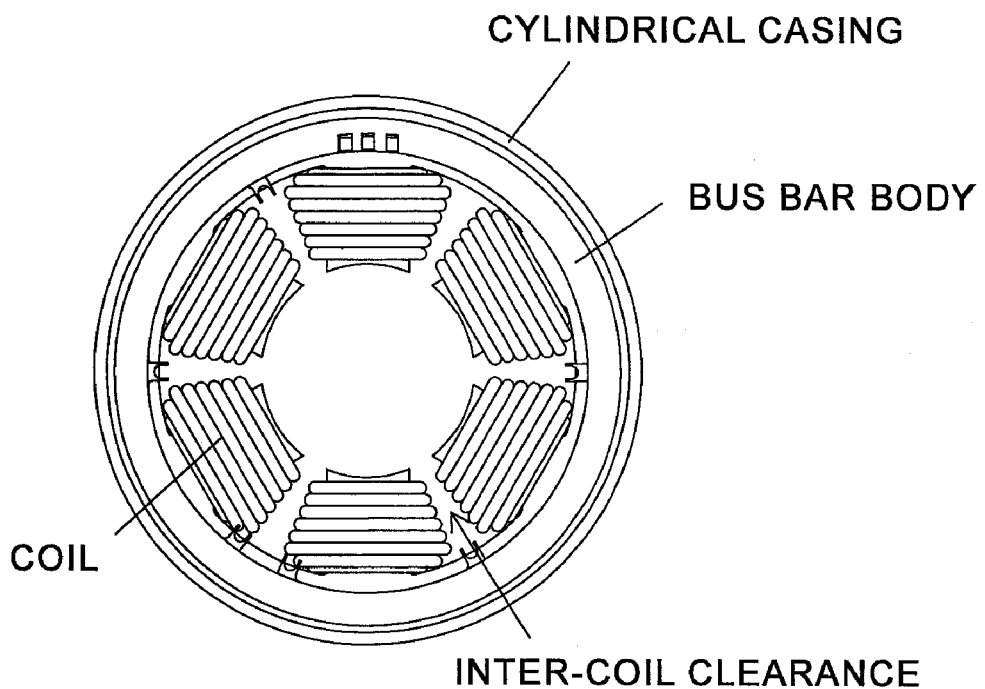
FIGS. 8A and 8B are views showing a second embodiment in which the bus bar is disposed near the outer circumference of the core, and coil-side terminals extend radially inward from the inner circumference of the bus bar.
Figure 8B:
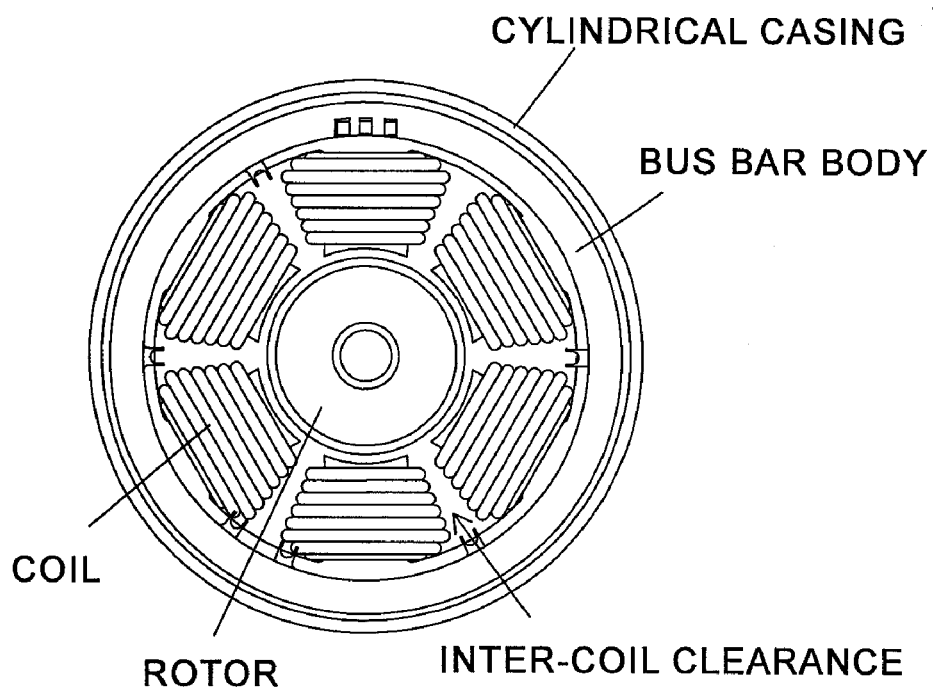
Figure 9A:
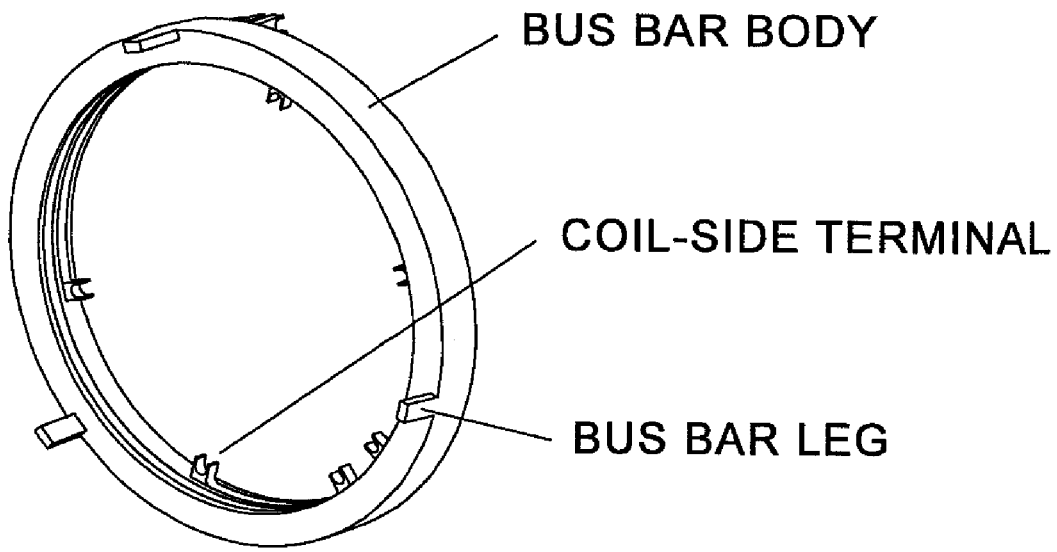
FIG. 9A is a perspective view of the bus bar of the second embodiment as viewed from one side thereof.

In the first embodiment as described above, the bus bar body is disposed to be located near the rotor (on the core wrings), and the terminals to which the windings are connected are provided on the radially outer side of the bus bar. However, in a second embodiment shown in FIGS. 8A and 8B, the bus bar body is disposed to be located near the outer circumference of the core, and the coil-side terminals are provided on the radially inner side of the bus bar. FIG. 8A is an end view of the stator with the rotor removed; and FIG. 8B is an end view of the stator with the rotor assembled. FIG. 9A is a perspective view of the bus bar of the second embodiment as viewed from one side thereof; and FIG. 9B is a perspective view of the bus bar of the second embodiment as viewed from the other side thereof.

Figure 9B:
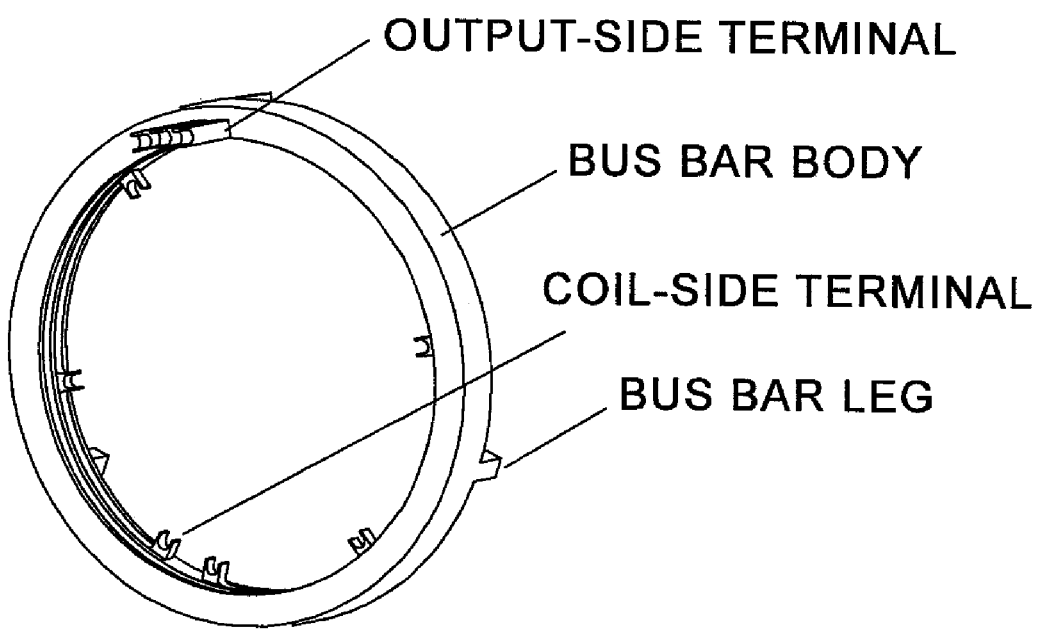
FIG. 9B is a perspective view of the bus bar of the second embodiment as viewed from the other side thereof.

As shown in FIGS. 9A and 9B, the bus bar according to the second embodiment also includes a cylindrical bus bar body formed of a resin, and three or more (three in the in the illustrated example) bus bar legs integrally formed with the bus bar body. The legs are inserted into and attached to the axially extending core grooves which are provided on the outer circumferential surface of the magnetic-pole core, and, as shown in FIG. 1, the stator with the bus bar attached thereto are fixedly disposed within the cylindrical casing.

As in the case of the bus bar according to the first embodiment, the bus bar body has a small radial dimension or length such that the bus bar body does not close the inter-coil clearances. However, the second embodiment differs from the first embodiment in that a cooling air follow passage is secured on the radially inner side of the bus bar body. The occupying area can be reduced by means of disposing the wiring bars of the bus bar to form two or more layers of wiring bars in the axial direction as in the case of the bus bar according to the first embodiment.

As shown in FIGS. 9A and 9B, the coil-side terminals (six terminals in the in the illustrated example) project radially inward from the bus bar body, and three output-side terminals axially project from the bus bar body toward a side opposite the stator coils. The bus bar body is disposed within the cylindrical casing to be located at a radially outer side (on the core cylindrical portion), and has a radial dimension such that the bus bar body does not close the inter-coil clearances. Further, the coil-side terminals to which the ends of the coils are connected and which are likely to generate heat are disposed on the radially inner side of the bus bar body such that the terminals do not overlap the core arm portions as viewed in the motor axis direction, whereby the coil-side terminals are positioned in the flow passages along which cooling air flows.

Figure 10:
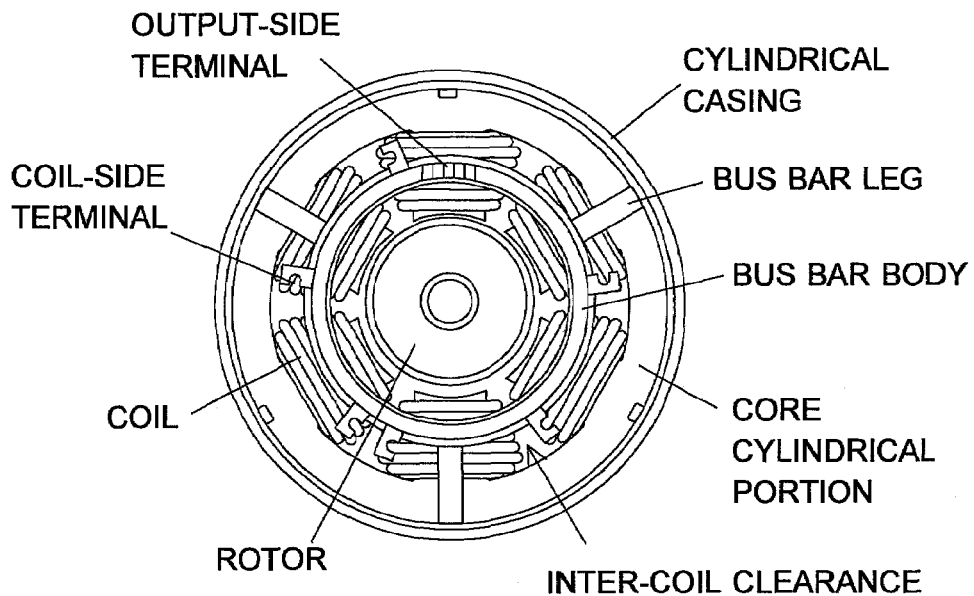
FIG. 10 is a view showing a third embodiment in which the bus bar is disposed in the vicinity of the radially central position of the core.
Figure 11:
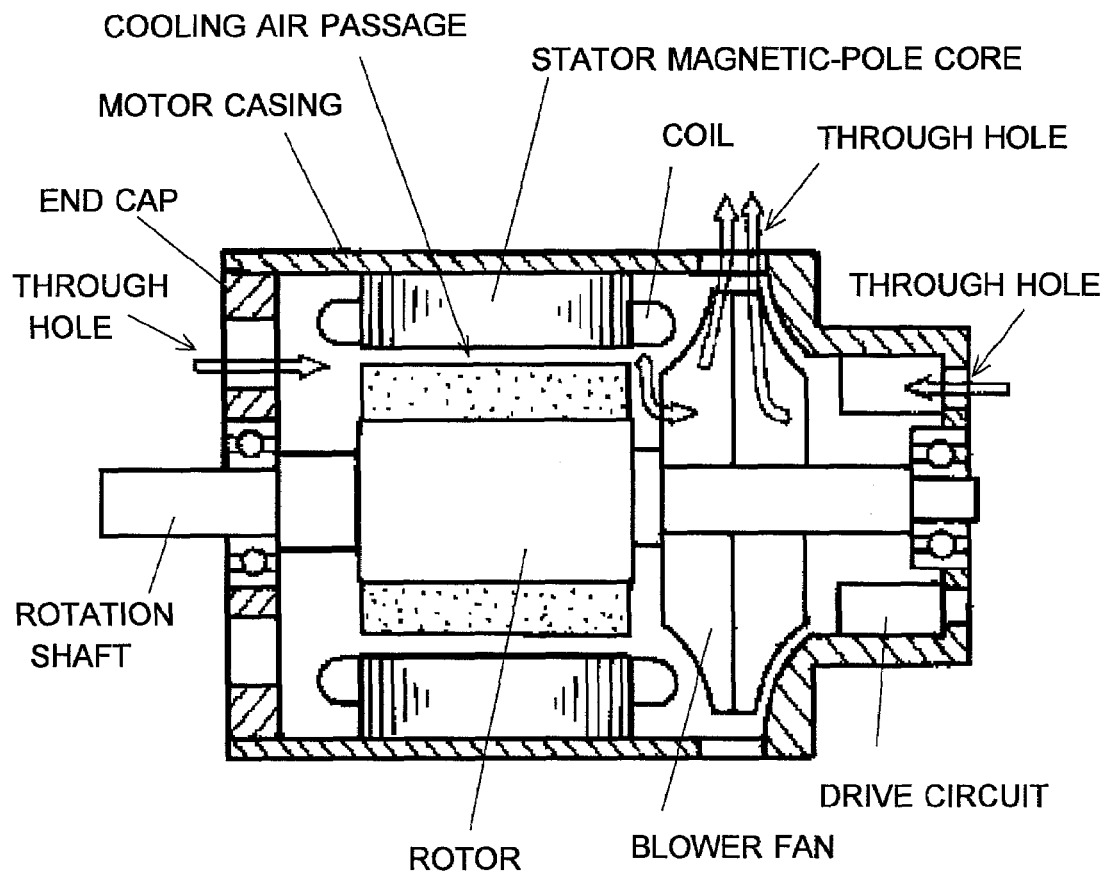
FIG. 11 is a view showing the structure of a conventional motor cooling apparatus.
Figure 12:
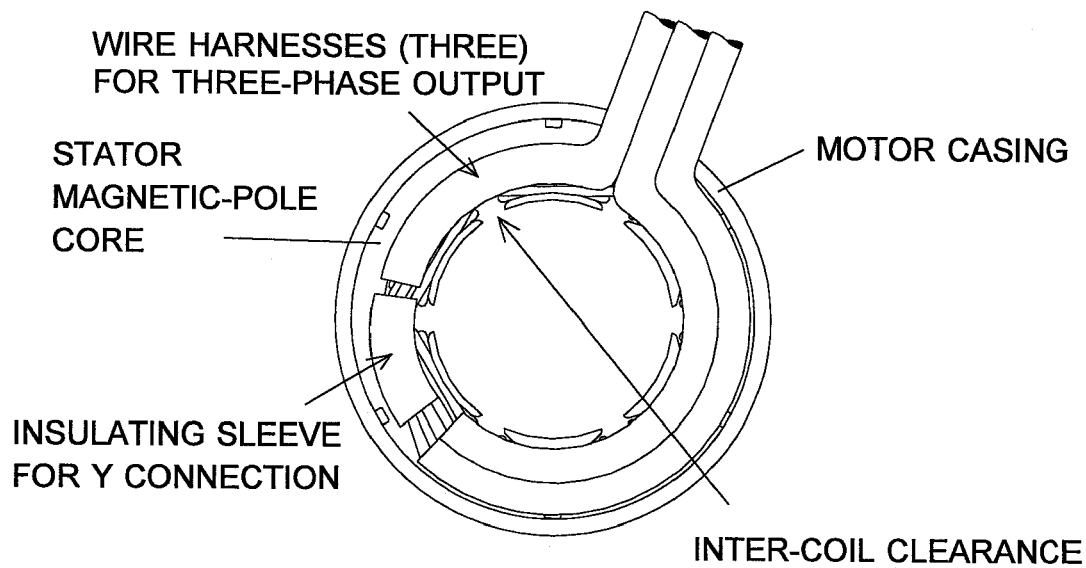
FIG. 12 is a view of a stator as viewed from a side from which coils are extended, and shows an example in which wire harnesses are used.
Figure 13:
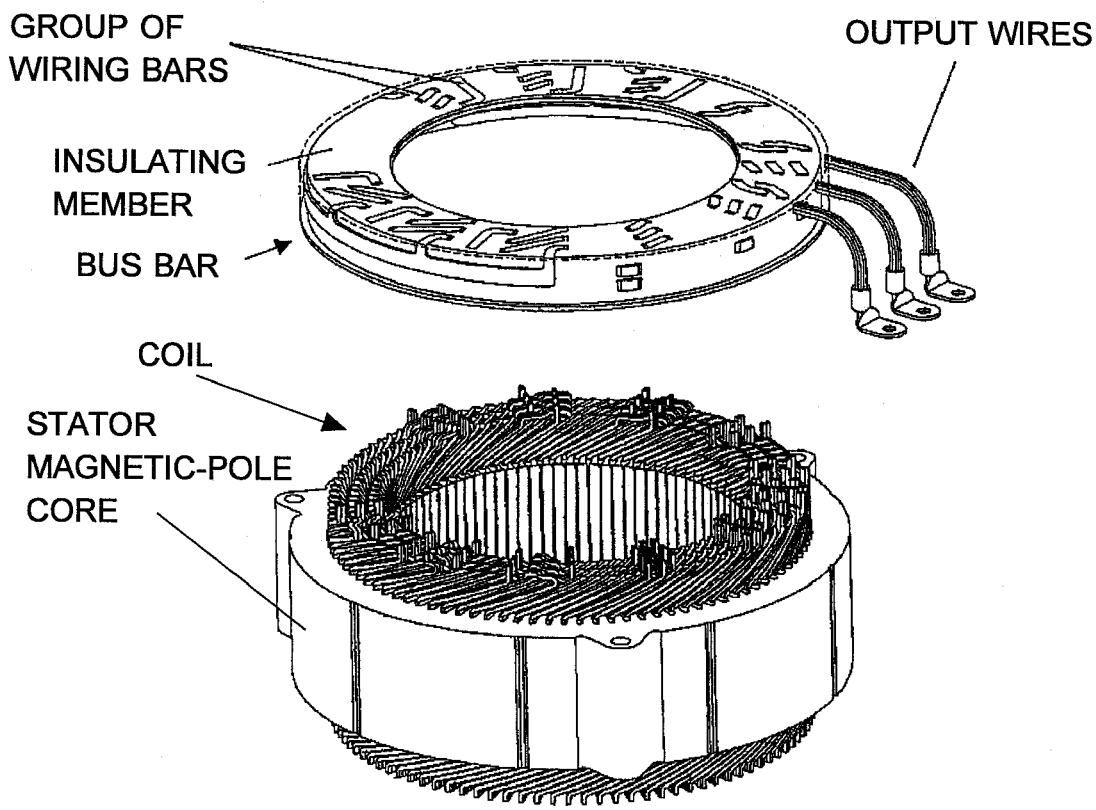
FIG. 13 is a view showing a method of connecting coils by making use of a bus bar.

FIG. 10 is a view showing a third embodiment in which the bus bar is disposed in the vicinity of the radially central position of the core. FIG. 10 is an end view with the rotor assembled. The bus bar according to the third embodiment also includes a cylindrical bus bar body formed of a resin, and three or more (three in the in the illustrated example) bus bar legs integrally formed with the bus bar body. The legs are inserted into and attached to the axially extending core grooves which are provided on the outer circumferential surface of the magnetic-pole core, and the stator with the bus bar attached thereto is fixedly disposed within the cylindrical casing.

As in the case of the bus bars according to the first and second embodiments, the bus bar body has a small radial dimension or length such that the bus bar body does not close the inter-coil clearances. However, the third embodiment differs from the first and second embodiments in that a cooling air follow passage is secured on each of the radially inner and outer sides of the bus bar body. The occupying area can be reduced by means of disposing the wiring bars of the bus bar to form two or more layers of wiring bars in the axial direction as in the case of the bus bars according to the first and second embodiments.

As shown in FIG. 10, the coil-side terminals project radially outward from the bus bar body, and three output-side terminals axially project from the bus bar body toward a side opposite the stator coils. The bus bar body is disposed in the vicinity of the radially central portions of the core arm portions (see FIG. 4B), and has a radial dimension such that the bus bar body does not close the inter-coil clearances. Further, the coil-side terminals to which the ends of the coils are connected and which are likely to generate heat are disposed on the radially inner side or outer side of the bus bar body (in the illustrated example, all the coil-side terminals are located on the radially outer side) such that the terminals do not overlap the core arm portions as viewed in the rotor axis direction, whereby the coil-side terminals are positioned in the flow passages along which cooling air flows.

What is claimed is:

1. A brushless motor comprising:
   a stator fixedly provided within a motor housing and a rotor fixed to a rotation shaft in which a plurality of coils wound around a stator magnetic-pole core are connected together and connected to output wires by use of a bus bar, wherein:
   the bus bar includes a body portion formed of an insulating member and having grooves formed therein, and wiring bars each of which is formed of an electrically conductive metal and has integrally formed connection terminals and which are disposed in the grooves;
   the coils are wound around the stator magnetic-pole core such that clearances are formed within magnetic-pole core slots;
   the bus bar is disposed at one axial end of the stator magnetic-pole core with an axial clearance formed between the bus bar and the coils, and the body portion has such a radial dimension that at least a portion of the clearances within the magnetic-pole core slots is left uncovered;
   said bus bar having legs integrally formed with said body portion, said legs being inserted into axially extending core grooves, said axially extending core grooves being provided on an outer circumferential surface of said stator magnetic-pole core, said legs of said bus bar connecting said body portion to said stator magnetic-pole core; and
   air holes are formed in the motor housing on opposite sides of the stator magnetic-pole core to thereby form cooling air passages extending through the magnetic-pole core slots.

2. A brushless motor according to claim 1, wherein a disk-shaped sensor rotor for position detection, which has a diameter smaller than an inner diameter of the body portion of the bus bar, is provided on the rotor to be located radially inward of the body portion, and the body portion of the bus bar has an outer diameter smaller than an outer diameter of the magnetic-pole core.

3. A brushless motor according to claim 1, wherein the bus bar is fixed along an inner wall surface of a cylindrical motor casing, which constitutes the motor housing.

4. A brushless motor according to claim 1, wherein:
the bus bar legs are disposed to overlap core arm portions of the stator magnetic-pole core around with the coils are wound; and
a width of said bus bar legs is less than a width of said core arm portions.

5. A brushless motor according to claim 1, wherein the connection terminals of the bus bar to which ends of the coils are connected are disposed to overlap clearances between the core arm portions as viewed in the axial direction of the motor, whereby the connection terminals are positioned on passages of air flowing through the clearances.

6. A brushless motor according to claim 1, wherein the wiring bars of the bus bar each have a cross sectional area greater than that of a wire forming the coils.

7. A brushless motor according to claim 1, wherein:
the motor housing is composed of a cylindrical motor casing, and end and front bells attached to opposite opening portions of the motor casing; a cooling fan is fixed to the rotation shaft to be located on one side of the rotor;
air intake and discharge holes are formed in the cylindrical motor casing, the end bell, or the front bell to be located on opposite sides of the stator magnetic-pole core; and
a diameter of a sensor rotor for position detection is less than a diameter of a circle on which said air holes are located.

8. A brushless motor comprising:
a motor housing;
a rotor having a rotation shaft fixed thereto;
a plurality of output wires;
a bus bar comprising a plurality of legs, a body portion, wiring bars and an output-side terminal integrally connected to one of said wiring bars, said body portion comprising an insulating member, said insulating member defining a plurality of grooves in said body portion, each wiring bar being formed of an electrically conductive metal and integrally formed connection terminals, each connection terminal being disposed in one of said grooves;
a stator fixed within said motor housing, said stator comprising a plurality of coils and a stator magnetic-pole core, said stator magnetic-pole core having an outer circumferential surface, said outer circumferential surface defining a plurality of axially extending core grooves, said plurality of coils being wound about said stator magnetic-pole core such that each coil is located at a spaced location from an adjacent coil to define a plurality of magnetic-pole core slots, each magnetic-pole core slot defining a coil clearance between one of said coils and another of said coils, said output wires being connected to said plurality of coils via said bus bar, said bus bar being disposed at one axial end of said stator magnetic-pole core, said bus bar being located at a spaced location from said plurality of coils to define an axial clearance, said body portion having a radial dimension such that at least a portion of said coil clearances is not covered by said body portion, each leg of said bus bar being inserted into one of said axially extending core grooves, each of said legs extending in an axial direction, said legs and said axially extending core grooves defining a connection means for connecting said bus bar to said magnetic-pole core, said housing having a first plurality of air holes disposed on a first side of said stator magnetic-pole core and a second plurality of air holes disposed on a second side of said stator magnetic-pole core, said first side of said stator magnetic-pole core being opposite of said second side of said stator magnetic-pole core, said first plurality of air holes, said second plurality of air holes and said plurality of magnetic-pole core slots defining cooling air passages, said output-side terminal extending in a direction opposite said axial direction of said plurality of legs.

9. A brushless motor according to claim 8, further comprising a disk-shaped sensor rotor for position detection, said disk-shaped sensor rotor having a sensor rotor diameter, said body portion having an inner body diameter, said sensor rotor diameter being less than said inner body diameter, said disk-shaped sensor rotor being provided on the rotor such that said disk-shaped sensor is located radially inward of the body portion, said body portion having an outer body diameter, said magnetic-pole core having an outer magnetic-pole core diameter, said outer body diameter being less than said outer magnetic-pole core diameter.

10. A brushless motor according to claim 8, wherein said motor housing comprises a cylindrical motor casing, said motor casing comprising an inner wall surface, said bus bar being fixed along said inner wall surface.

11. A brushless motor according to claim 8, wherein:
said plurality of bus bar legs are integrally connected to the body portion;
said stator magnetic-pole core comprises core arm portions, said bus bar legs being disposed such that each of said bus bar legs is located opposite one of said core arm portions, each of said coils being wound about one of said core arm portions; and
each bus bar leg having a bus bar leg width, each core arm portion having a core arm portion width, said bus bar leg width being less than said core arm portion width.

12. A brushless motor according to claim 8, wherein each end of said coils is connected to one of said connection terminals, each of said core arm portions being located at a spaced location from another one of said core arm portions to define a plurality of core arm clearances, said connection terminals being disposed such that at least a portion of each connection terminal is located opposite one of said core arm clearances, said connection terminals being arranged in said cooling passages.

13. A brushless motor according to claim 8, wherein said coils comprise wire, said wire having a wire cross sectional area, each of said wiring bars of the bus bar having a wiring bar cross sectional area, said wiring bar cross sectional area being greater than said wire cross sectional area.

14. A brushless motor according to claim 8, wherein:
the motor housing comprises a cylindrical motor casing, an end bell and a front bell, said motor casing having a first opening and a second opening, said second opening being located opposite said first opening, said end bell being attached to said motor casing at said first opening, said front bell being attached to said motor casing at said second opening;
a cooling fan is fixed to said rotation shaft, said cooling fan being located on one side of the rotor;

said air holes comprising air intake and discharge holes, said air intake and discharge holes being located in one or more of said cylindrical motor casing, said end bell and said front bell; and a sensor rotor has a sensor rotor diameter, said air holes being arranged along a circular diameter, said sensor rotor diameter being less than said circular diameter.

15. A brushless motor according to claim 8, wherein:

said coils comprise wire, said wire having a wire cross sectional area, each of said wiring bars of the bus bar having a wiring bar cross sectional area, said wiring bar cross sectional area being greater than said wire cross sectional area;

the motor housing comprises a cylindrical motor casing, an end bell and a front bell, said motor casing having a first opening and a second opening, said second opening being located opposite said first opening, said end bell being attached to said motor casing at said first opening, said front bell being attached to said motor casing at said second opening;

a cooling fan is fixed to said rotation shaft, said cooling fan being located on one side of the rotor;

said air holes comprising air intake and discharge holes, said air intake and discharge holes being located in one or more of said cylindrical motor casing, said end bell and said front bell; and a sensor rotor has a sensor rotor diameter, said air holes being arranged along a circular diameter, said sensor rotor diameter being less than said circular diameter.

16. A brushless motor comprising:

a motor housing;

a rotor having a rotation shaft fixed thereto;

a plurality of output wires;

a bus bar comprising a plurality of legs, a body portion, wiring bars and an output-side terminal integrally connected to one of said wiring bars, said body portion comprising an insulating member, said plurality of legs being integrally connected to said insulated member, said insulating member defining a plurality of grooves in said body portion, each wiring bar being formed of an electrically conductive metal and integrally formed connection terminals, each connection terminal being disposed in one of said grooves;

a stator fixed within said motor housing, said stator comprising a plurality of coils and a stator magnetic-pole core, said stator magnetic-pole core having an outer circumferential surface, said outer circumferential surface defining a plurality of axially extending core grooves, said plurality of coils being wound about said stator magnetic-pole core such that each coil is located at a spaced location from an adjacent coil to define a plurality of magnetic-pole core slots, each magnetic-pole core slot defining a coil clearance between one of said coils and another of said coils, said output wires being connected to said plurality of coils via said bus bar, said bus bar being disposed at one axial end of said stator magnetic-pole core, said bus bar being located at a spaced location from said plurality of coils to define an axial clearance, said body portion having a radial dimension such that at least a portion of said coil clearances is not covered via said body portion, each leg of said bus bar being inserted into one of said axially extending core grooves, each of said legs extending in an axial leg direction, said legs and said axially extending core grooves defining a connection means for connecting said bus bar to said magnetic-pole core, said housing having a first plurality of air holes disposed on a first side of said stator magnetic-pole core and a second plurality of air holes disposed on a second side of said stator magnetic-pole core, said first side of said stator magnetic-pole core being opposite of said second side of said stator magnetic-pole core, said first plurality of air holes, said second plurality of air holes and said plurality of magnetic-pole core slots defining cooling air passages, said output-side terminal extending an output-side terminal axial direction, said output-side terminal axial direction being opposite said axial leg direction a disk-shaped sensor rotor, said disk-shaped sensor rotor having a sensor rotor diameter, said body portion having an inner body diameter, said sensor rotor diameter being less than said inner body diameter.

17. A brushless motor according to claim 16, wherein said disk-shaped sensor rotor being provided on the rotor such that said disk-shaped sensor is located radially inward of the body portion, said body portion having an outer body diameter, said magnetic-pole core having an outer magnetic-pole core diameter, said outer body diameter being less than said outer magnetic-pole core diameter.

18. A brushless motor according to claim 16, wherein said motor housing comprises a cylindrical motor casing, said motor casing comprising an inner wall surface, said bus bar being fixed along said inner wall surface.

19. A brushless motor according to claim 16, wherein:

said stator magnetic-pole core comprises core arm portions, said bus bar legs being disposed such that each of said bus bar legs is located opposite one of said core arm portions, each of said coils being wound about one of said core arm portions; and each bus bar leg having a bus bar leg width, each core arm portion having a core arm portion width, said bus bar leg width being less than said core arm portion width.

20. A brushless motor according to claim 16, wherein each end of said coils is connected to one of said connection terminals, each of said core arm portions being located at a spaced location from another one of said core arm portions to define a plurality of core arm clearances, said connection terminals being disposed such that at least a portion of each connection terminal is located opposite one of said core arm clearances, said connection terminals being arranged in said cooling passages.

* * * * *